US008909987B2

(12) United States Patent
Karp et al.

(10) Patent No.: US 8,909,987 B2
(45) Date of Patent: Dec. 9, 2014

(54) RECOVERY SEGMENTS

(75) Inventors: Alan H. Karp, Palo Alto, CA (US); Dhruva Chakrabarti, San Jose, CA (US); Wojciech Golab, Mountain View, CA (US); Terence P. Kelly, Palo Alto, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 270 days.

(21) Appl. No.: 13/458,680

(22) Filed: Apr. 27, 2012

(65) Prior Publication Data
US 2013/0290780 A1 Oct. 31, 2013

(51) Int. Cl.
*G06F 11/00* (2006.01)

(52) U.S. Cl.
USPC .............................................. 714/15; 714/13

(58) Field of Classification Search
CPC ........................... G06F 9/486; G06F 11/14382
See application file for complete search history.

(56) References Cited

U.S. PATENT DOCUMENTS

| | | | |
|---|---|---|---|
| 6,425,110 B1 * | 7/2002 | Hathaway et al. | 716/108 |
| 6,519,712 B1 | 2/2003 | Kim et al. | |
| 6,718,538 B1 * | 4/2004 | Mathiske | 717/129 |
| 7,165,186 B1 | 1/2007 | Viswanatham et al. | |
| 7,206,964 B2 | 4/2007 | Moser et al. | |
| 7,516,361 B2 * | 4/2009 | Vick et al. | 714/15 |
| 8,185,870 B2 * | 5/2012 | Burdick et al. | 717/120 |
| 8,250,405 B2 | 8/2012 | Elnozahy | |
| 8,281,317 B1 * | 10/2012 | Backensto et al. | 719/312 |
| 8,495,573 B2 * | 7/2013 | Craft et al. | 717/124 |
| 2002/0087916 A1 * | 7/2002 | Meth | 714/16 |
| 2004/0255299 A1 * | 12/2004 | Brenner et al. | 718/102 |
| 2005/0257090 A1 * | 11/2005 | Santos et al. | 714/35 |
| 2009/0094582 A1 * | 4/2009 | Craft et al. | 717/127 |
| 2010/0050176 A1 * | 2/2010 | Vanderpool | 718/100 |

OTHER PUBLICATIONS

Guermouche, A. et al.; "Hydee: Failure Containment Without Event Logging for Large Scale Send-deterministic MPI Applications"; May 21-25, 2012; 12 pages.

Monnet, S. et al.; "A Hierarchical Checkpointing Protocol for Parallel Applications in Cluster Federations"; Apr. 26-30, 2004; 8 pages.

* cited by examiner

*Primary Examiner* — Christopher McCarthy (57) ABSTRACT

In one example, a method for implementing recovery segments includes sending an application message from a parent process executed by a first computing device to a child process executed by a second computing device and identifying a dependency created by the application message. This identified dependency is included in a dependence set of the child process and saved. A checkpoint is generated by the parent process and a checkpoint message that includes dependency information is sent from the parent process to the child process. The child process modifies the dependence set according to the dependency information and generates a second checkpoint that is saved in nonvolatile memory of the second computing device. Upon occurrence of a failure of the parent process, the child process reverts to a most recent checkpoint generated by the child process that does not include the effects of processing an orphan message.

14 Claims, 5 Drawing Sheets

RECOVERY SEGMENTS

BACKGROUND

As software applications run on larger and larger computer systems, performing longer and longer computations, there is increasing likelihood that one or more computer components will fail during a run. Unfortunately, the ability to efficiently complete extremely large scale computations despite component failures is an unsolved issue. Even applications that include their own recovery mechanisms exhibit excessive failure-free overhead and coordination times that can exceed the mean time to failure. For extremely large scale computations, the overhead and coordination times associated with failure recovery can become so burdensome that it is infeasible to execute the computation.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Computing applications have increased both the quantity of data they deal with and the amount of processing they do on that data. In order to keep up with the increasing demand, many of these applications have been parallelized to run on hundreds of thousands of processors. The result is that such an application relies on so many hardware components that at least one of them is likely to fail during execution of the application (a "run"). The concept of "resilience" is used to describe the ability of the large scale application to produce a successful result even though hardware or other failures occur. Assuring "consistency" between processes in the large scale application allows the large scale application to recover from a failure. Consistency refers to maintaining compatible states across all computers involved in executing the large scale application. The danger is that after recovery a process will have "forgotten" that it sent a message to another process before it failed. This will result in processes with incompatible states that compromise the operation of the application.

For example, when a process q receives a message from a process p, the state of q becomes dependent on the state p was in at the time p sent the message to q. If p fails and needs to recover from a state before the one it was in when p sent the message to q, q's state will be inconsistent with the recovered state of p. On recovery, the p's state is not consistent with the other computing devices and cannot be relied on by the application to produce an accurate end result.

A simple example shows the challenges that large scale applications face in distributed computing. Assume that a large scale application is executed on 100,000 networked computing devices. If the mean time to failure for a single computing device is one year, there will likely be about one failure every hour during execution of the large scale application.

Developers have previously had two choices to assure consistency: build resilience into the computing application or building resilience into its runtime on a platform that provides the needed physical redundancy to allow several copies of the application to run in parallel. Building resilience into the application is difficult because of the required modifications to the applications in the workflow and the large amount of computation and communication overhead generated by the modified applications. For example, computing applications that include their own recovery mechanisms can exhibit excessive overhead and coordination times that can exceed the mean time to failure.

Building physical redundancy into the computing architecture so that copies of processes can run in parallel is often cost prohibitive. Additionally, it is difficult to know how many copies of the redundant, communicating processes are needed. Statistical analysis helps with independent failures, but correlated failures occur in practice. In addition, a redundancy factor of X results in a failure-free overhead proportional to X.

The principles described below show how to construct and use coordinated, application-unaware checkpointing to mitigate the effects of hardware failures when running at a very large scale. The principles allow a subset of components to recover from a failure of one or more of the components within the subset before the system as a whole has reached a globally consistent state. This significantly reduces the overhead and coordination time for recovery mechanisms and allows for faster recovery to more recent computational points than standard approaches. A wide variety of enterprise workflows have a structure that may benefit from adopting the application of principles described below.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
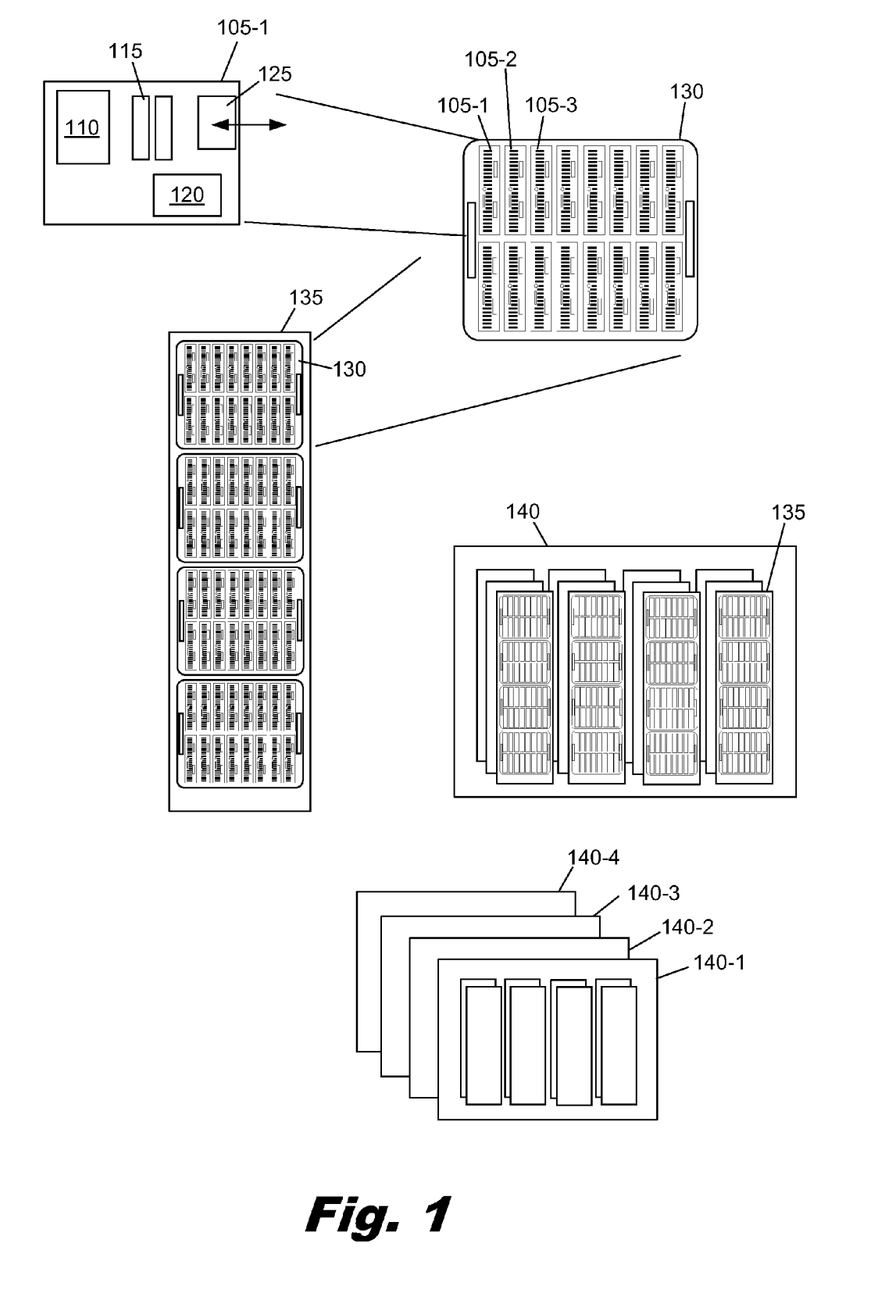
FIG. 1 is a diagram of a large scale computer system used for execution of a distributed computing application, according to one example of principles described herein.

FIG. 1 is a diagram of a large scale computing system used for execution of a distributed computing application using recovery segments for recovery after a hardware failure. In this example, a computer (105), such as Hewlett Packard's ProLiant® Blade server, is used as a basic unit in the large scale computing system. The computer (105) includes a processor (110) and random access memory (115) with a capacity of megabytes or more. The processor may be a single core processor, a multicore processor, or the computer may include multiple processors. The computer also includes a communication module (125) that is for communicating with other computing devices over a network. In some implementations, a hard drive (120) may be associated with each computer (105). In other implementations, the computer (105) may use external storage instead of a hard drive.

The computer (105) may be a modular design that minimizes the physical space and power it consumes. For example, the computer (105) may be housed in a blade enclosure (130) with a number of other computers. In this example, one blade enclosure (130) includes 16 computers, including computers (105-1, 105-2, and 105-3). A number of blade enclosures (130) may be arranged in a rack (135) and a number of racks (135) may be included in a data center (140). For example, a data center (140) may include tens of thousands of computers. In some examples, a large scale application may run on computers within a single data center. In other examples, a large scale application may run on computers housed in multiple data centers (140-1, 140-2, 140-3, 140-4). Examples of large scale applications include scientific and research programs such as climate modeling, biological research, code breaking or nuclear simulations. Examples from enterprise workflows include internet search algorithm optimization, marketing research, supply chain management, and other applications.

In one example, a large scale application is executed by the computers (105) that make up the data centers (140). Processes A, B, and C are processes within the large scale computing application and are executed on computers 105-1, 105-2, and 105-3, respectively. In one example, the instructions for executing processes A, B, and C are received over the communication modules (125) in the respective computers (105) and stored on their hard drives (120) or in their random access memory (115). The instructions for the processes, including the recovery segment instructions and methods described below are executed by the processors (110) in the respective computers (105). Messages are passed between the processes A, B, and C using the communication modules (125) and a network that interconnects each of the computers executing the large scale application. This is only one example of architectures that could be used to execute processes within a large scale application. A variety of other implementations could be used. For example, multiple processes could be executed by a single computer using a multicore processor. Alternatively, one of the processes could be distributed to two or more computers.

As discussed above, using large numbers of computers can substantially increase the likelihood of failures during execution of the application. A technique called "backward error recovery" can be used to ensure fault tolerance in distributed computing systems. Backward error recovery includes, upon detection of a failure, restoring a distributed computation to an error-free global state from which it can be resumed to produce a correct behavior. Global checkpointing is one of the techniques to pursue the backward error recovery. Global checkpointing involves storing a snapshot of a current application state, and later on, using it to restart execution of the application in case of failure. Each global checkpoint records the operational state of each component, processors, application and message at the time of the global checkpoint.

However, global checkpointing induces considerable overhead into the application. For example, the length of time needed to produce a global checkpoint may exceed the mean time to failure of the devices involved in making the computation. In the example used above, an average of one failure per hour can be expected for a large scale application that is executed on 100,000 computing devices with an individual mean time to failure of one year. If producing a global checkpoint takes an hour or even a significant fraction of an hour, there is a significant chance that a failure will occur during production of the global checkpoint. A global checkpoint might not be produced in that case.

To recover from this failure, the system can be rolled back to the last valid checkpoint at the expense of losing previous computational results. After recovery, the application can resume execution and attempt to establish another global checkpoint at a future time. However, there is no guarantee that there will be no hardware failures during this process or that the new global checkpoint will be successfully generated.

Application-aware checkpointing is one solution to checkpointing where the application controls the checkpoint process and checkpoints are made at times designated by the application. However, there are challenges in implementing application-aware checkpointing, including expensive modifications to applications, limited scalability and high overhead traffic.

Application-unaware checkpointing falls into two categories, uncoordinated and coordinated, both of which assume recovery from a globally consistent state. With uncoordinated checkpoints, processes take checkpoints independently. However, after a failure a globally consistent set of those checkpoints can be used for recovery. Checkpoints that are not part of a globally consistent state are a source of failure-free overhead. Also, there is no guarantee that a globally consistent state exists other than the initial state of the program, meaning that the program is merely restarted, defeating the purpose of checkpointing. For example, even if global checkpoints are successfully generated, the need for establishing a consistent state after a failure may force other processes within the application to roll back to their checkpoints, which, in turn, may cause other processes to roll back to even earlier checkpoints, which in the most extreme case may mean that the only consistent state found is the initial state (the "domino effect").

Coordinated checkpointing relies on processes sending special messages in order to guarantee that the checkpoints taken in response to those messages are part of a globally consistent state. Should a failure occur before the coordination completes, all those checkpoints are discarded. Unfortunately, with tens of thousands of processes, the coordination time can exceed the mean time to failure. A simple solution is to checkpoint before sending each message (checkpoint-on-send), but the result is a high failure-free overhead. Another approach is to delay the checkpoints and hold outgoing messages until several incoming messages have been processed—an approach that amortizes the cost of the checkpoints at the price of delaying the release of outgoing messages.

The description below describes principles for coordinated, application-unaware checkpointing to mitigate these challenges. The principles allow a subset ("recovery segment") of processes within the application to recover from a failure of one or more of the components before the system as a whole has reached a globally consistent state. This enables the application to make forward progress in situations where the global checkpoint approaches do not.

Figure 2:
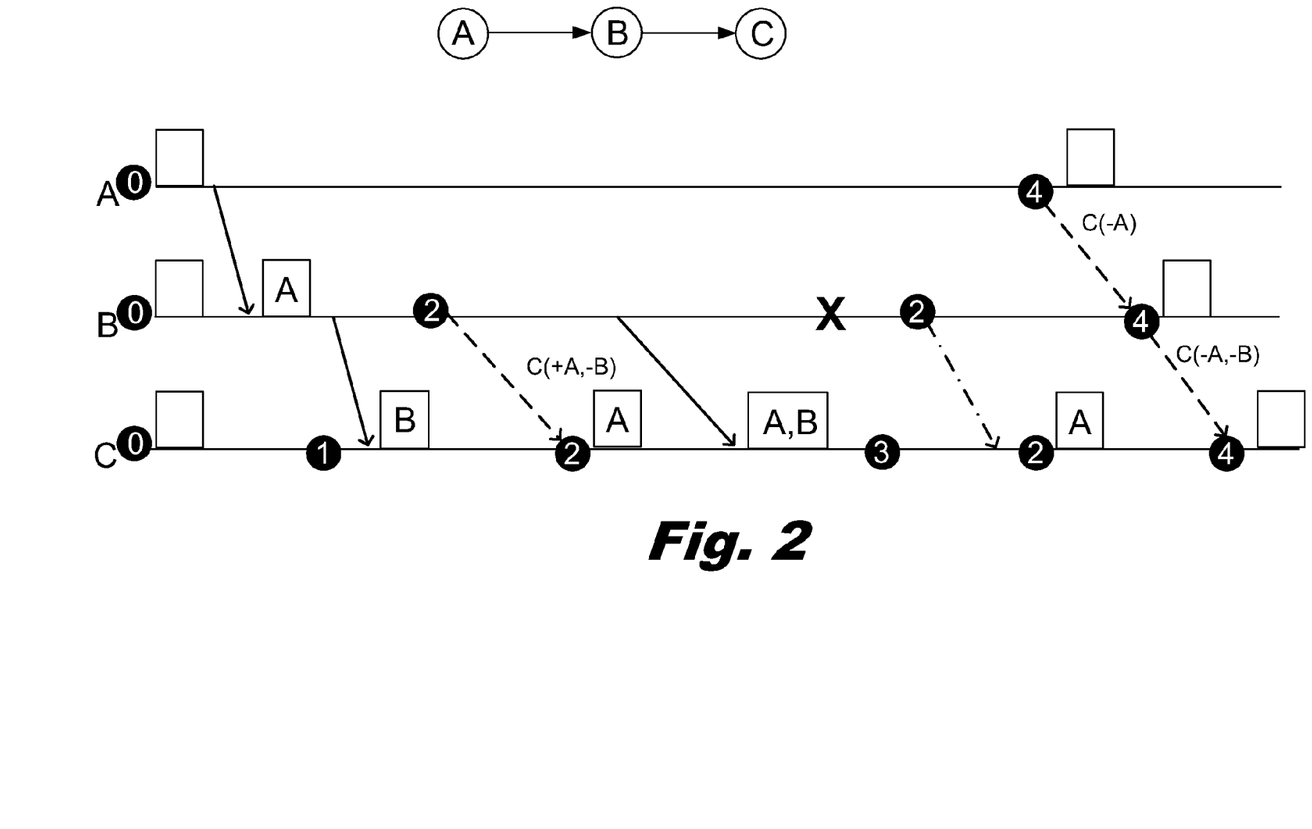
FIG. 2 is a schematic diagram of a method for resilient execution of a large scale computing application, according to one example of principles described herein.

FIG. 2 is a simplified schematic diagram of a system and method for resilient execution of a large scale computing application using recovery segments. As discussed above, this computing application includes at least three processes, A, B, and C that are executed on individual computing devices. The messaging topology of these three processes is shown at the top of FIG. 2. Process A sends communications/results to process B and process B sends communications/results to C. Thus there is one way communication between A, B, and C shown by unidirectional arrows between A, B, and C. This simple topology has been selected to illustrate principles of resilient execution of computer applications using recovery segments. These principles can be applied to a wide range of topologies. The term "parent process" and "child process" refer to messaging hierarchy among the various processes that make up the application. The term "parent process" refers to an upstream process or upstream neighbor that sends a message to another process. The term "child process" refers to a downstream process or downstream neighbor that receives a message from another process. A process may simultaneously be both a "parent process" and a "child process." In the example shown in FIG. 2, process A is the parent of process B. Process B is the child of process A and the parent of process C. Process C is the child of process B.

Turning now to the lower portion of FIG. 2, each of the long horizontal lines is a time line for one of the three processes (A, B, and C). The upper horizontal line is a time line for process A, the middle line is a timeline for process B and the lower line is a timeline for process C. The earliest time is shown on the left of the diagram and the latest time is on the right of the diagram. Checkpoints are denoted by numbers in black circles. The head (tail) of an arrow in the topology diagram denotes the "downstream (upstream) neighbor" of the process at the tail (head) of the arrow. Solid arrows denote "application messages". Dotted arrows denote "checkpoint messages" that are sent from the checkpointing process to all its downstream neighbors. A dot-dash line shows a "recovery message" sent by a process following recovery.

When a process acts on an application message from an upstream neighbor, the state of the receiving process becomes dependent on the state of the upstream neighbor and processes that the upstream neighbor is dependent on at the time it sent the message. Each process maintains a separate dependence set for each upstream neighbor. The dependence set of the process is the union of these dependence sets. The dependency between the child process and the parent process indicates that, should the parent process fail, all messages sent from the parent to the child become an orphan messages. The dependency between the processes continues until the parent successfully generates a checkpoint and notifies the child process to remove the dependency or dependencies. The checkpoint records the state of the parent process and accounts for the message sent from the parent to the child. After a checkpoint, the message will no longer be an orphan and the dependency of the child process on the parent process terminates. The term "dependency" refers to a method for tracking messages that may become orphans if a failure of the parent process occurs. Thus, the child process is dependent on the state of a parent process if the child has received an application message from the parent but the parent has not recorded a checkpoint after sending the message.

The open boxes in FIG. 2 show this dependency information. These dependencies for a given process are called a "dependency set." Each process keeps a dependence set listing the other processes it is conditional on. For example, the box containing "A,B" on the line for C denotes that the state of C depends on the state of process A and the state or process B that has not been recorded in checkpoints of these processes. As discussed above, the process saves its state to persistent storage by writing a "checkpoint." Each checkpoint is labeled with the tag that appears in checkpoint messages associated with it. The dependence set of a checkpoint is the union of the dependence sets for the upstream neighbors as recorded in the checkpoint at the time the checkpoint is taken. If all the dependence sets of a checkpoint are empty, the checkpoint is "unconditional." Otherwise, it is "conditional."

A checkpoint with an empty dependence set is called "unconditional." Otherwise, the checkpoint is called "conditional." As discussed above, the dependence of a process on its upstream neighbor ("parent process") is removed when the upstream neighbor subsequently records its state in a checkpoint. Checkpoint messages include changes to be applied to the dependence sets of the receiving process and its existing conditional checkpoints. The changes to the dependence sets that are included in checkpoint messages are shown by text next to the dashed arrows that represent the checkpoint messages.

The various actions, states and dependencies shown in FIG. 2 will now be described, starting at the earliest time shown on the left of the diagram and working across the diagram to the right. On the left, the application is started and the three processes are initialized. The application may include additional processes that are not shown in FIG. 2. The initial states of the processes are represented by checkpoints 0 on each of the process timelines. There is no interdependency between the processes because no messages have been sent. This lack of dependency is shown by the empty boxes on each timeline. Thus, the starting state is a global checkpoint and represents the trivial case of a globally consistent state.

An application message is sent from process A to process B. This is represented by a solid arrow from the process A timeline to the process B timeline. This message makes process B dependent on process A. This is shown by the "A" in a box on the B timeline. Process B can automatically assume this dependency exists because it received and acted on an application message from process A.

Process C generates a checkpoint 1, shown by the "1" in the black circle. Process B then sends an application message to process C. Process C assumes, correctly, that it is now dependent on process B. This is shown by the "B" in a rectangle on the C process timeline. Process B then generates checkpoint 2, shown by the "2" in the black circle. Process B also sends a checkpoint message to process C. This checkpoint message is shown as a dashed arrow from process B to process C with the text "C(+A, −B)." The checkpoint message instructs C to remove B and add A to its dependency set for B. Checkpoint C responds by generating checkpoint 2 and replacing dependency B with A. This is shown by the "2" in the black circle on process C timeline and the "A" in the dependency box. This has created a recovery segment that includes process B and process C. They have both generated consistent checkpoints and process C is not dependent on process B. This recovery segment is independent of, does not include, the process state of A. If process B fails and then recovers, the recovery segment (which includes process B and all its dependent processes) can then be reverted to this locally consistent state without action by process A.

As used in the specification and appended claims, the term "recovery segment" refers to a parent process and its dependent processes that have all produced consistent checkpoints that allow the parent process and its dependent processes to recover from a failure of the parent process and/or its dependent processes. The term "orphan message" describes a message that has been sent by a parent process to a child process and received by the child (making the child process dependent on the parent), such that the parent subsequently fails and forgets that it has sent the message. The term "consistent" refers to states or checkpoints in which there are no orphan messages between the designated processes.

Thus, a recovery segment can independently recover from a failure of a parent process to a locally consistent state without requiring the entire application to revert to the last global checkpoint. The term "locally consistent state" refers to a parent process and its dependent processes (a recovery segment) that have all recorded a consistent set of checkpoints in which the child process is not dependent on the parent process. In large scale computing, there may be multiple recovery segments within the application. Additionally, the communication architecture and dependencies between the various processes need not be linear or unidirectional.

Next, process B sends another application message to process C. This is shown as a solid arrow from the process B timeline to the process C timeline. Process C correctly assumes that its state is now dependent on both process A and process B. This is shown by both "A" and "B" in the dependency rectangle.

Process B then fails as shown by the black "X" on the process B timeline. This failure may occur for a variety of reasons, including hardware breaking, a fatal operation in the process or other reason. After the failure, process C generates a checkpoint 3.

At some later time, process B recovers. For example, the computing device(s) hosting process B may have been rebooted or process B may have been switched to a different computing device. On recovery, process B returns to its most recent checkpoint. In this case, B returns to checkpoint 2. The last application message sent from process B to process C is now an orphan. Process B is unaware that it previously sent this application message but process C is relying on this orphan message for its current state.

Process B sends a recovery message to processes that depend on it. The recovery message from process B to process C is shown as a dash dot arrow from the process B timeline to the process C timeline. The recovery message from B to C contains a unique tag T and the recovery dependence set of B, which is empty because B has received no recovery messages. C adds B to its recovery dependence set for the recovery messages with tag T. If C had downstream neighbors, C would include a recovery dependence set consisting of the union of C and C's recovery dependence set in the recovery messages it sends. Recovery dependence sets are discussed in more detail below.

Process C reverts its state to the most recent locally consistent state. In this case the most recent locally consistent checkpoint recorded by C is checkpoint 2. Checkpoint 2 is not dependent on the state of any process in C's recovery dependence set, even though it is dependent on process A. This guarantees that C recovers from a checkpoint that does not depend on any orphan messages. This is shown as a "2" in the black checkpoint circle and an "A" in the dependency box. Thus, checkpoint 2 allows for local recovery of the recovery segment (process B and process C) even though checkpoint 2 is not consistent with any checkpoint of process A. There is no action required by process A during the recovery of the recovery segment. The recovery segment has recovered from the failure of process B and the application and its various processes can now continue. Process A continues without interruption and processes B and C continue from checkpoint 2.

Process A then generates a checkpoint 4 and sends a checkpoint message to process B. The checkpoint message instructs process B that it is no longer dependent on process A because process A has recorded the fact that it has sent a message to process B in its checkpoint 4. In response, Process B generates its own checkpoint 4 and sends a checkpoint message to process C instructing process C that it is no longer dependent on either A or B. In response, Process C generates its own checkpoint 4 and modifies its dependence set by removing all dependencies on A and B. This is a globally consistent state. Globally consistent states do not have dependencies because a record of all messages that have been sent from parent process to child processes is recorded in the checkpoints. Thus there will be no orphan messages when the system returns to the global state. The state information contained in the various checkpoints may be stored in local or external nonvolatile memory for retrieval when a failure occurs.

In the case described above, process B failed and its local recovery segment was able to recover without rolling back to the most recent globally consistent state. This resulted in a faster and less disruptive recovery because process A was not interrupted. Additionally, the application did not have to roll all the way back to the last globally consistent state, which, in this case, is at the start of the application execution. The concept of recovery segments can be used to significantly decrease the overhead required to generate checkpoints because creating a locally consistent state does not require as much coordination as generating a globally consistent state. Globally consistent states can then be generated less frequently because the locally consistent states can be relied on to recover from most failures.

It is not always possible to recover from a subset of the checkpoints. In the example above, a globally consistent state is needed if process A fails before taking checkpoint 4 because the effects of messages it has sent appear in the states of the other two processes. Such need for global consistency may occur in general because we wish to minimize the number of checkpoints.

Some applications, such as enterprise applications, have a special structure. They often include complex workflows among independent, parallelized applications. Inter-application messages are much less frequent than intra-application messages, allowing the opportunity to optimize the number of checkpoints taken. Clearly, any checkpoint conditional on another process may end up being discarded during recovery, such as process C's checkpoint 3 in FIG. 2, and any sent messages recorded in them are canceled. That is not a problem for messages to other processes, but output—messages that affect the outside world (processes or systems not under the control of the application)—cannot be recalled. Hence, messages to the outside world can only reflect a state recorded in an unconditional checkpoint. However, there is no need to wait for all processes to produce unconditional checkpoints. A process can release the outputs associated with a checkpoint as soon as its dependence set at a checkpoint becomes unconditional. In FIG. 2, process B can release its outputs as soon as it completes the checkpoint labeled 4 without waiting for C to complete its corresponding checkpoint.

Figure 3:
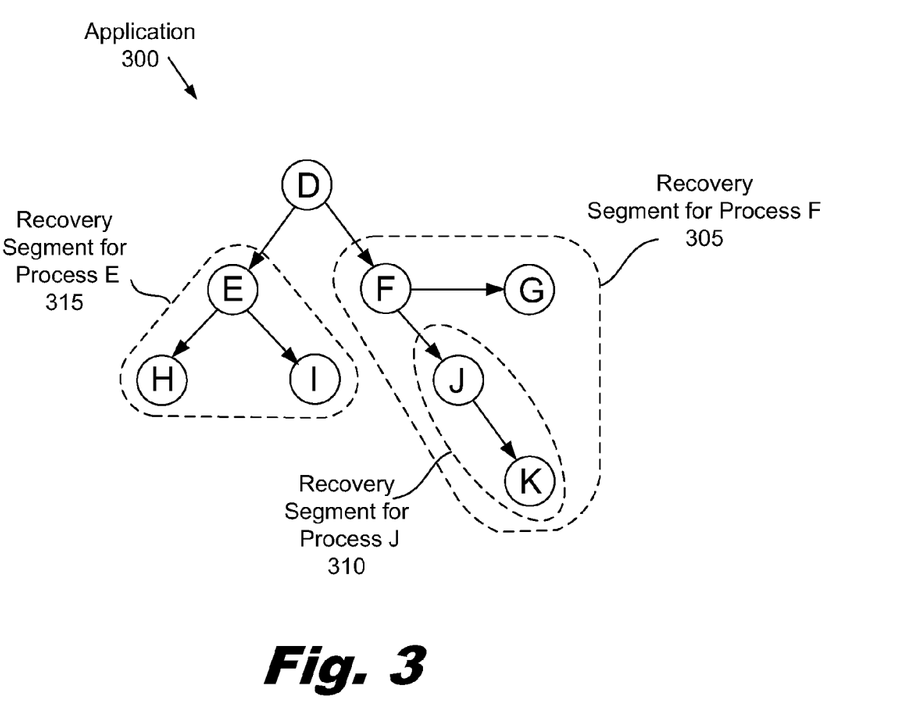
FIG. 3 is a diagram of recovery segments in a computing application, according to one example of principles described herein.

FIG. 3 is a diagram showing various recovery segments (305, 310, 315) within a computing application (300). As discussed above, a recovery segment is a parent process and its dependent processes that have generated at least one locally consistent checkpoint that allows the parent process and its dependent processes to recover from a failure of the parent process without requiring action by processes outside of the recovery segment. In the example shown in FIG. 3, a root process D sends messages to processes E and F. Process E sends application messages to processes H and I. Thus, process E and its child processes H and I can form a recovery segment (315).

Process F sends messages to process G and J. Process J sends messages to process K. Thus, process F and its downstream child processes G, J, and K can form an outer recovery segment (305). A separate inner recovery segment (310) can be formed that includes processes J and K. In general, recovery segments can be formed inside other recovery segments and, depending on the flow of messages and checkpoint generation, a recovery segment can change shape and composition during execution of the application.

One implementation of a recovery segment protocol is described more formally below. The description below assumes that the large scale computing application includes a connected, directed graph of processes that exchange messages over reliable, First-In-First-Out (FIFO), one-way channels. There is no assumption that the processes are deterministic or that the messages are idempotent, although the processes may be deterministic and/or the messages may be idempotent. Each process maintains a dependence set for each upstream neighbor. The dependence set of the process is the union of these dependence sets. The dependence set of a checkpoint is the union of the dependence sets for the upstream neighbors as recorded in the checkpoint.

A process can send either an "application message" that carries application specific state, or a "control message" that carries control information. Application messages are processed by the application and make the recipient conditional on the processes the sender is conditional on (the sender's dependence set) and on the sender (upstream neighbor). For example, when a process q receives an application message from a process p, q adds p and the processes in p's dependence set to q's dependence set for p. The union of all the dependence sets of q's upstream neighbors becomes q's dependence set.

A control message can be either a "checkpoint message" or a "recovery message." Each control message has a tag. For example, the tag may be a data tag that uniquely identifies each control message. Control messages are handled by the infrastructure and do not make the recipient conditional on the sender.

A message that has been processed to completion has been "consumed." An application message is considered to be consumed when the effects of processing it appear in an unconditional checkpoint. A checkpoint message is considered to be consumed by a process when the checkpoint message results in no changes to the process's dependence set. A recovery message is considered to be consumed by a process once that process has recovered from a prior checkpoint in response to receiving that recovery message. Orphan messages are considered to have been consumed. The reliable messaging component guarantees that each message is eventually consumed at least once. The infrastructure associated with each process ensures that each message is consumed at most once. Thus, each received message is processed once unless the receiving process recovers from a checkpoint earlier than the receipt of the message, in which case the procedure repeats until the message is consumed. A unique identifier attached to each message may be used to enforce these rules.

The assumptions stated above are used to describe one particular implementation of the recovery segment principles and protocols. The assumptions do not restrict the application of the recovery segment principles and protocols to systems that do not exhibit the assumptions. The principles and protocols may be implemented in a variety of ways to produce recovery segments that can recover to a locally consistent state when a failure occurs.

When a process p sends an application message to a process q, q becomes conditional on p and on all the processes in p's dependence set. When q subsequently sends an application message to process r, r becomes conditional on both p and q and on their dependence sets. Different variants of the protocol convey this transitive dependence information differently. In one case, each message carries the dependence set of the sender. In another, changes to be applied to the receiving process's dependence set are sent with checkpoint messages. The protocol below describes the latter.

A process p may take a checkpoint at any time and assigns its dependence sets to the checkpoint. If all the dependence sets are empty, the checkpoint is unconditional. Otherwise, the checkpoint is conditional. When the checkpoint is complete, p sends a checkpoint message to each of its downstream neighbors, which includes instructions to update the receiving process's dependence sets. These instructions include two sets, one a set of processes to add to the receiving process's dependence sets and the other a set of processes to remove from the receiving process's dependence sets. These are called the "add set" and the "remove set." For example, a process p may create a checkpoint with a unique tag T at any time and assigns its dependence sets for its upstream neighbors to the checkpoint. When the checkpoint is complete, the process sends to each of its downstream neighbors a checkpoint message with tag T, an add set including p's dependence set, and a remove set containing only p.

When a process q receives a checkpoint message with tag T from process p, then process q removes p from q's dependence set for p. If q does not have a checkpoint with tag T, q adds the processes in the add set to, and removes the processes in the remove set from, its dependence set for p and takes a checkpoint, assigning tag T and q's dependence sets for q's upstream neighbors to it. Process q updates the dependence set for p in its checkpoint with tag T and of all q's conditional checkpoints produced before its checkpoint with tag T.

If q took a checkpoint or changed the dependence set of the checkpoint with tag T in response to the checkpoint message, q sends a checkpoint message with tag T to each of its downstream neighbors with the dependence set of the checkpoint with tag T as the add set and the union of q and the received remove set as the remove set. A checkpoint message with tag T is consumed by a process when that process's checkpoint with tag T becomes unconditional.

If the checkpoint p takes is not in response to receiving a checkpoint message, the remove set may consist of p. When a process q receives a checkpoint message from p, q makes the indicated changes to its dependence set and that of any prior conditional checkpoints. This update may add some entries into the dependence sets and remove some.

If q has seen this message before, and the message does not result in a change to q's dependence set, q marks this checkpoint message as having been consumed. According to the assumptions stated above, the infrastructure guarantees that q will not see this checkpoint message again.

If q has seen this checkpoint request before, and the message results in a change in q's dependence set, q sends a checkpoint message to each of its downstream neighbors that includes process q's updated dependence set as the add set and the remove set q received augmented with q. If q has not seen this checkpoint message before, q updates its dependence set, takes a checkpoint marked with q's updated dependence set, and sends a checkpoint message that includes q's updated dependence set as the add set and the remove set q received augmented with q. If the dependence set of a checkpoint becomes empty, outputs recorded in the checkpoint can be released to the outside world.

When a process p recovers from a failure, it recovers from its most recent checkpoint and sends a recovery message to all of its downstream neighbors. Each recovery message contains a "recovery dependence set" used by the receiving process to know which checkpoint to recover from. When a process q receives a recovery message from p, q sends this recovery message to all of its downstream neighbors. Process q recovers from its most recent checkpoint that is not conditional on any process in q's recovery dependence set for the tag associated with the recovery message, and marks the recovery message as having been consumed. The infrastructure guarantees that q will not see this recovery message again.

Every recovery message contains a recovery dependence set used by the receiving process to know which checkpoint to recover from. The use of the recovery dependence set is described in more detail in the following example. When a process p recovers from a failure, it recovers from its most recent checkpoint and sends a recovery message to all of its downstream neighbors. In this example, the recovery message's recovery dependence set consists of p. When a process q receives a recovery message with tag T, the process q determines if this is the first recovery message with tag T received by q. If so, q sets its recovery dependence set for tag T to the empty set.

Process q adds the recovery dependence set in the message to q's recovery dependence set for tag T. Process q records its recovery dependence set in its most recent checkpoint that is not conditional on any process in q's recovery dependence set for tag T, denoted checkpoint C. The update changes q's recovery dependence set for tag T. Process q sends to each of its downstream neighbors a recovery message with tag T and a recovery dependence set that includes a union of q and q's recovery dependence set. Process q recovers from checkpoint C. In this example, the recovery message is consumed when the receiving process has recovered in response to receiving it.

The system described above is a robust, versatile method for implementing recovery segments during coordinated application-unaware checkpointing. Because the application is not aware of the checkpointing and failure recovery processes, no modification to the application is required. Thus, any suitable application can be supported by the recovery method described. Further, there is no need to wait to reach a globally consistent state to be able to recover from some failures or to have to hold outbound messages until global checkpoints are complete. Additionally, there is a reduced possibility of unbounded roll-back compared to techniques that use uncoordinated checkpoints.

Figure 4:
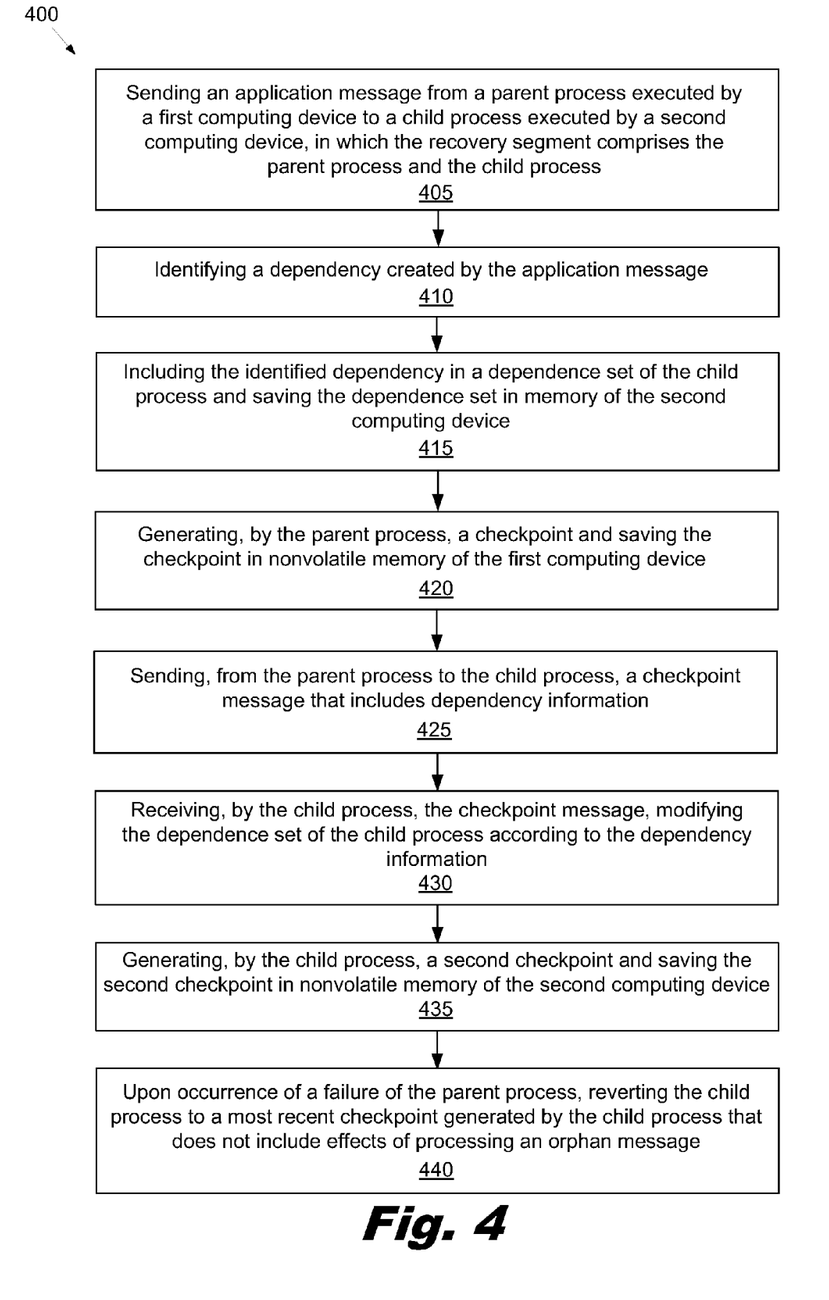
FIG. 4 is a flowchart showing an illustrative method for resilient execution of a large scale computing application, according to one example of principles described herein.

FIG. 4 is a description of one implementation of a process (400) for using recovery segments to recover from a failure in a large scale computing application. An application message is sent from a parent process executed by a first computing device to a child process executed by a second computing device (block 405). A dependency created by the application message is identified (block 410). The identified dependency is included in a dependence set of the child process and the dependence set is saved in memory of the second computing device (block 415). The recovery segment comprises the parent process and the child process. The parent application generates a checkpoint and saves the checkpoint in nonvolatile memory of the first computing device (block 420). The parent process sends a checkpoint message that includes dependency information to the child process (block 425). The child process receives the checkpoint message and modifies its dependence set according to the dependency information (block 430). The child process generates a second checkpoint and saves the second checkpoint in nonvolatile memory of the second computing device (block 435). If the child process has any children processes, the child process sends a checkpoint message to these children processes. This process continues to pass checkpoint messages downstream until all the processes downstream from the parent checkpoint have received a checkpoint message.

This second checkpoint typically does not include a dependency on the parent process. Upon occurrence of a failure of the parent process, the child process reverts to a most recent checkpoint generated by the child process that does not include the effects of processing an orphan message (block 440). Specific examples of the various blocks are described, for example, in FIGS. 2 and 5.

Figure 5:
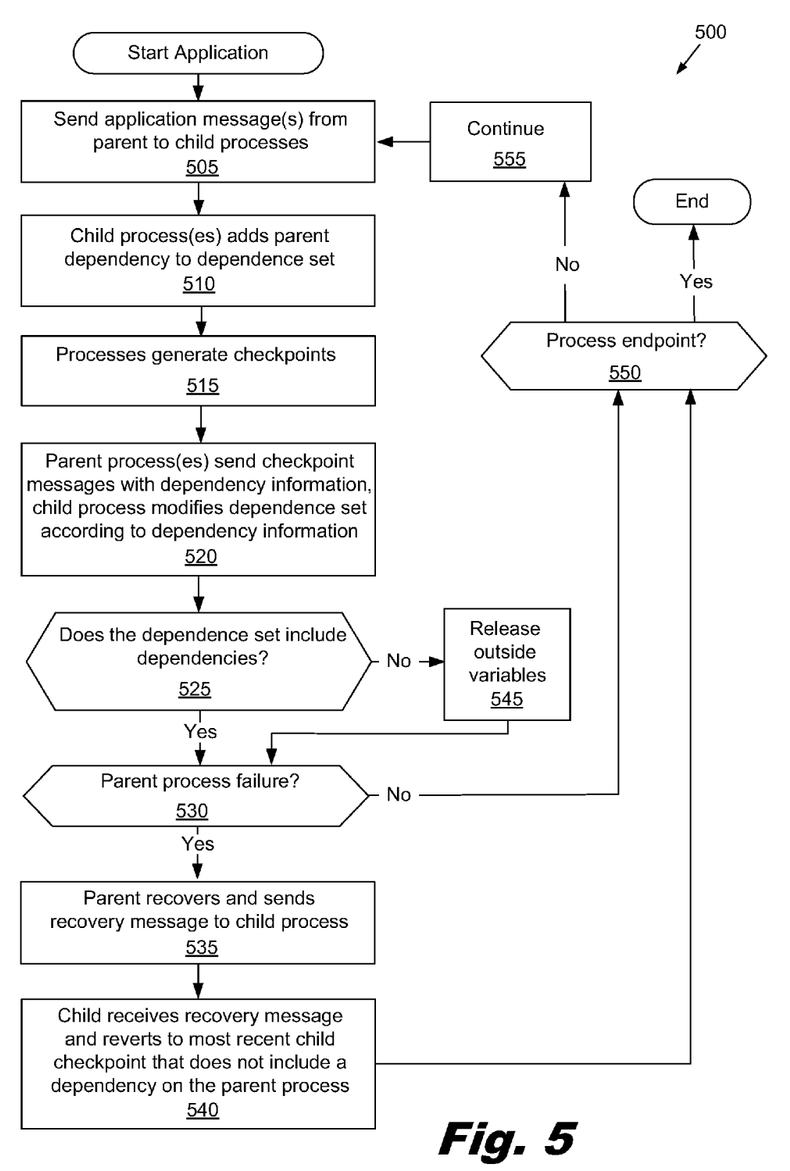
FIG. 5 is a flowchart showing an illustrative method for resilient execution of a large scale computing application, according to one example of principles described herein.

FIG. 5 is a more detailed description of a process for using recovery segments to recover from a failure during execution of a large scale computing application. The application starts by loading various processes onto appropriate computing devices. For example, a parent process may be executed on a first computing device and the child process may be executed on a second computing device. The recovery segment includes the parent process and the child process.

Application messages are sent from parent to child processes (block 505). This flow of messages is dynamic and interaction between the processes may produce application messages that flow in one direction for a period of time and then reverse to flow a different direction. For example, a first process may send a first application message to a second process. The second process may respond by sending a second application message back to the first process. Thus, for the first message, the first process was the parent and the second process was the child. However, the roles reverse for the second message where the second process is the parent and the first process is the child. Consequently, the interrelationships and hierarchy between the processes are dynamic and are determined by the application messages that are sent.

Dependencies of the child process on the parent process are identified as a result of the application messages. Child processes add the identified dependencies to their dependence set when they receive application messages (block 510). The dependence set includes a list of all the current dependencies of the child process. These dependence sets are recorded in memory of the second computing device.

The processes generate checkpoints by recording their states in a way that allows them to recover to the recorded states (block 515). For example, a parent process generates a checkpoint by recording state information of the parent process in nonvolatile memory of the first computing device or in external memory such that the parent process can retrieve the state information and revert back to a state at the time of the checkpoint. The processes may generate checkpoints in a coordinated manner.

The parent processes send checkpoint messages with dependency information to the child processes and the child processes modify their dependence sets according to the dependency information (block 520). The dependency information may include dependencies to add to the dependence set of the child process and dependencies to remove from the dependence set of the child process. In response to receiving the checkpoint message, the child process also generates a checkpoint by recording state information of the child process at the time of the checkpoint such that the child process can retrieve the state information and revert back to a state at the time of the checkpoint. This checkpoint information may be stored in nonvolatile memory of the second computing device or in external memory.

Periodically a determination is made as to whether the dependence set for a given process includes dependencies (block 525). For example, when a process is holding outside variables or other messages that are to be sent to outside applications or systems, the process may check to determine if its dependence set includes dependencies. As discussed above, outside variables and messages are not released when the process has a dependence set that includes dependencies. If there are no dependencies in the dependence set ("No") outside variables are released (block 545). If there are dependencies the process continues ("Yes").

A determination is made to determine if a parent process has failed (block 530). If the parent has not failed ("No"), the process continues by determining if the end point for the process has been reached (block 550). If the end point has been reached ("Yes") the process ends. If the process has not ended ("No") the process continues (block 555) and application messages continue to be sent from parent to child processes (block 505).

If a parent process has failed ("Yes", block 530), the parent process recovers and sends a recovery message to the child process (block 535). The child process receives the recovery message and reverts to its most recent checkpoint that does not include undesirable dependency on the parent process (block 545). For example, reverting to a most recent checkpoint that does not include an undesirable dependency on the parent process may include reverting to a checkpoint that does not include the effects of processing any messages that have become orphan messages as a result of the failure of the parent process. If the child process has any downstream processes, it sends a recovery message to the downstream processes. The recovery message may be identical to or different from the recovery message the child process received. In one example, the recovery message indicates that the child process has reverted to a previous state recorded in a checkpoint. The downstream processes make appropriate reversions to compatible checkpoints. As discussed above, there may be processes outside of the recovery segment. In some situations, these outside processes are unaware of the failure of the parent process and do not revert to previous checkpoints as part of the recovery from the failure of the parent process. The application then continues to operate by determining if the end point for the process has been reached (block 550) and taking appropriate actions to end or continue the application.

In conclusion, the principles of recovery segments described above provide for failure recovery of large scale applications that is application independent. A failure of a parent process within a recovery segment can be resolved within the recovery segment without the need for reversion to a global checkpoint. This minimizes failure recovery overhead and minimizes the number of processes and computations that need to be reverted when a failure occurs.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for implementing recovery segments in a large scale computing application comprising:
    sending an application message from a parent process executed by a first computing device to a child process executed by a second computing device, in which the recovery segment comprises the parent process and the child process;
    identifying a dependency created by the application message;
    including the identified dependency in a dependence set of the child process and saving the dependence set in memory of the second computing device;
    generating, by the parent process, a first checkpoint and saving the first checkpoint in nonvolatile memory of the first computing device;
    sending, from the parent process to a child process, a checkpoint message that includes dependency information;
    receiving, by the child process, the checkpoint message and modifying the dependence set of the child process according to the dependency information;
    generating, by the child process, a second checkpoint and saving the second checkpoint in nonvolatile memory of the second computing device;
    upon occurrence of a failure of the parent process, reverting the child process to a most recent checkpoint generated by the child process that does not include effects of processing an orphan message.

2. The method of claim 1 in which the identified dependency comprises a dependency of the child state on the parent process as a result of the application message sent from the parent process to the child process.

3. The method of claim 1, in which the dependence set comprises separate dependency sets for each parent process of the child process.

4. The method of claim 1, in which generating a checkpoint by the parent process comprises recording sufficient state information of the parent process at the time of the checkpoint such that the parent process can retrieve the state information and revert back to a state at the time of the checkpoint.

5. The method of claim 1, in which the checkpoint message comprises instructions to update the dependence set of the child process.

6. The method of claim 1, in which the dependency information comprises dependencies to add to the dependence set of the child process and dependencies to remove from the dependence set of the child process.

7. The method of claim 1, further comprising after child process generates the second checkpoint and if the dependence set of the child process does not comprise any dependencies, then releasing outside messages by the child process.

8. The method of claim 1, further comprising, when the parent process fails, sending a recovery message to the child process.

9. The method of claim 1, further comprising sending a recovery message from the child process to processes that are downstream from the child process.

10. The method of claim 1, in which the method comprises coordinated application-unaware checkpointing, in which coordination comprises passing checkpoint messages and recovery messages from parent processes to child processes.

11. The method of claim 10, in which receipt of a checkpoint message from the parent process triggers the child process to generate the second checkpoint.

12. The method of claim 10, in which receipt of a recovery message from the parent process by a child process triggers the child process to revert to a most recent checkpoint generated by the child process that does not include effects of processing an orphan message.

13. The method of claim 1, in which the recovery segment comprises less than all the processes in the application; and processes in the recovery segment recover from failures of a parent process within the recovery segment without reversion of processes outside of the recovery segment.

14. A method for implementing recovery segments in a coordinated application-unaware failure recovery for large scale computing application, the method comprising:
    sending an application message from a parent process to a child process within the application, in which the parent process and child process are executed on at least one computing device in which the recovery segment comprises the parent process and the child process;
    identifying a dependency of the child state on the parent process as a result of the application message sent from the parent process to the child process;

including the identified dependency in a dependence set of the child process, in which the dependence set comprises a list of all the current dependencies of the child process and is recorded in memory the at least one computing device;

generating, by the parent process, a checkpoint by recording state information of the parent process at the time of the checkpoint on nonvolatile memory of at least one computing device such that the parent process can retrieve the state information and revert back to a state at the time of the checkpoint;

sending, from the parent process to a child process, a checkpoint message that includes dependency information comprising dependencies to add to the dependence set of the child process and dependencies to remove from the dependence set of the child process for the parent;

receiving, by the child process, the checkpoint message and modifying the dependence set of the child process for the parent according to the dependency information;

generating, by the child process, a checkpoint by recording state information of the child process at the time of the checkpoint such that the child process can retrieve the state information and revert back to a state at the time of the checkpoint, in which the checkpoint generated by the child process is triggered by receipt of the checkpoint message;

sending an additional checkpoint message from the child process to processes that are downstream from the child process;

if the dependence set of the child process does not comprise any dependencies, releasing outside variables of the child process;

when the parent process fails, sending a recovery message to the child process;

reverting the child process to a most recent checkpoint generated by the child process that does not include effects of processing an orphan message; and sending an additional recovery message from the child process to processes that are downstream from the child process.

\* \* \* \* \*